United States Patent [19]
Hartley

[11] Patent Number: 5,957,156
[45] Date of Patent: Sep. 28, 1999

[54] INSULATED VALVE HOUSING

[76] Inventor: Thomas W. Hartley, 8318 Atlantic Blvd., Jacksonville, Fla. 32211

[21] Appl. No.: 09/084,146

[22] Filed: May 26, 1998

[51] Int. Cl.[6] .................................................... F16L 53/00
[52] U.S. Cl. ............................................ 137/377; 137/382
[58] Field of Search ..................................... 137/377, 382

[56] References Cited

U.S. PATENT DOCUMENTS

| | | | |
|---|---|---|---|
| 4,903,719 | 2/1990 | Rains | 137/382 X |
| 5,374,248 | 12/1994 | Lopez | 137/382 X |
| 5,638,858 | 6/1997 | Gettinger et al. | 137/382 |
| 5,740,832 | 4/1998 | Griffin et al. | 137/382 X |

*Primary Examiner*—John Fox
*Attorney, Agent, or Firm*—Thomas C. Saitta

[57] ABSTRACT

An insulating housing for exposed pipeline valves, the housing having a base member which remains attached to the pipeline or pipeline connecting flanges and a removable cover member, where the base member is suspended above the ground and does not extend above the pipeline, so that access to the pipeline valves is maximized when the cover member is removed.

9 Claims, 3 Drawing Sheets

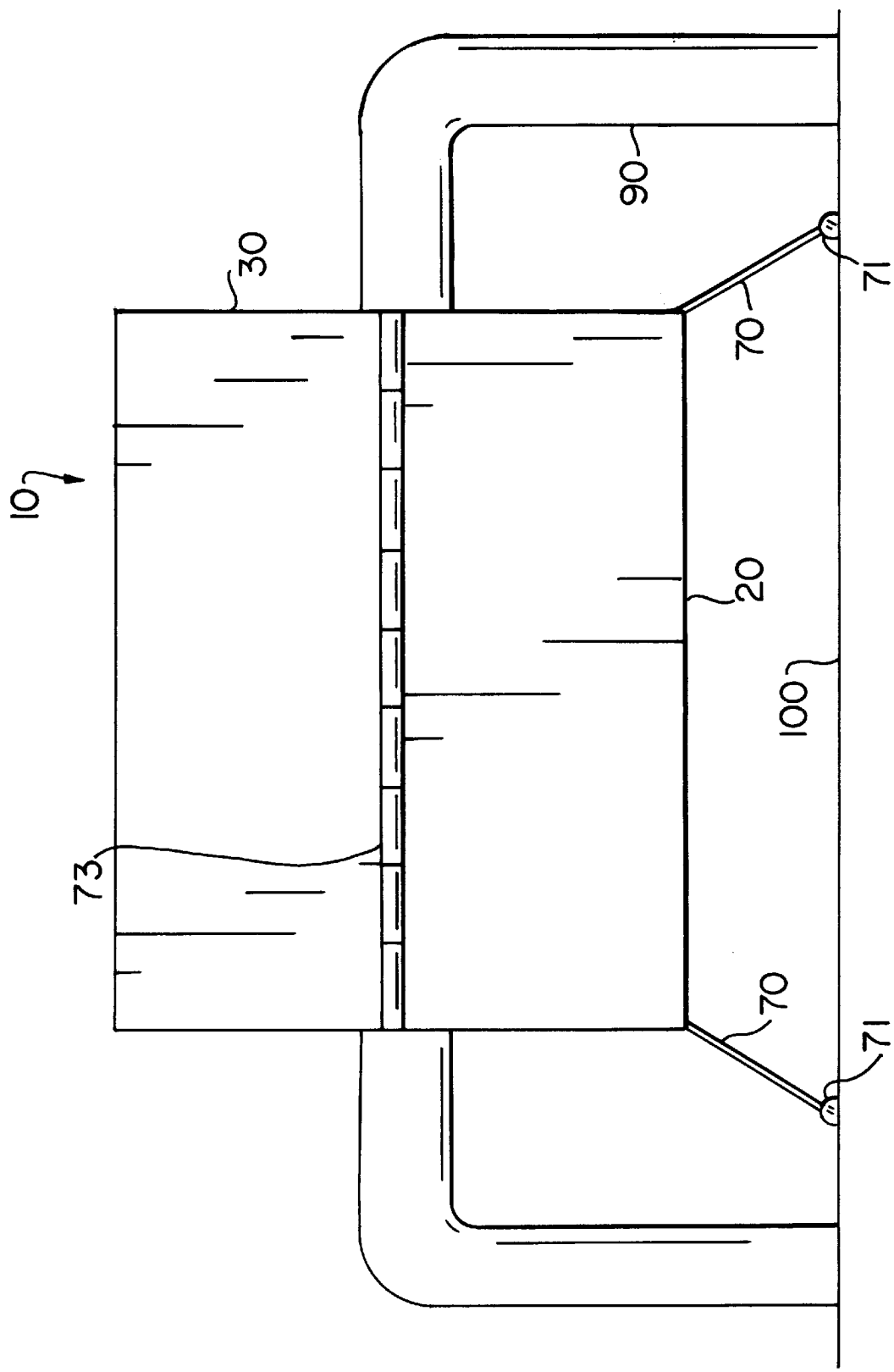

INSULATED VALVE HOUSING

BACKGROUND OF THE INVENTION

The invention relates generally to the field of covers, housings or boxes for externally exposed pipes or conduits having valves, gauges, backflow preventors or the like, where the valves or other components need to be protected from ambient weather conditions, and in particular from freezes. More particularly, the invention relates to such devices where the cover includes access means, such as a door, panel or the like, to allow the valves to be operated, checked, repaired, etc. Even more particularly, the invention relates to such devices where the cover or housing is attached to the pipes or connecting flanges of the pipes themselves so as to be suspended above the ground surface, and further where the housing is divided into two major portions, where the complete upper portion of the housing is removable from the pipes without removal of the lower portion.

In many instances pipes or conduits containing a fluid susceptible to freezing, e.g., water, or excessive heat loss, e.g., steam, must have short segments of the pipeline exposed or removed from any insulating media to provide access to valves, gauges, reducers, backflow preventors, relief ports, or other like elements. For example, many pipelines will be buried underground except for short, inverted, U-shaped segments which are positioned above ground for access. The valves or other elements are oddly shaped in comparison to the tubular configuration of the pipeline and often extend at angles from the central axis of the pipeline. It is necessary or at least beneficial in many instances to provide an external housing or cover, often insulated, which encompasses the valves or other elements to protect them from damage and exposure to the extreme conditions. The housings are either supported by the ground, floor, slab or other base member, or are attached to the pipes themselves and suspended above the ground. Examples of such housings may be seen in U.S. Pat. No. 4,890,638 to Davenport, which shows a ground supported housing having a removable upper lid, U.S. Pat. No. 1,690,461 to Sieben, showing a box mounted onto the pipeline with a removable front and bottom wall member, and U.S. Pat. No. 5,522,420 to Martin, showing a housing having a removable top panel with the housing attached to the pipeline itself and having mounting means to attach the housing to a support base. Another solution to the problem of exposed valves is shown in U.S. Pat. No. 3,724,491 to Knudsen et al., which utilizes an insulating shell mounted directly onto the pipeline about the flanges, where the cover is customized to mate with the particular valve configuration being covered. Obviously, the latter solution suffers from the need to customize each cover to the particular application, a problem not encountered with the box-like housings shown in the other patents. The ground or base supported housing suffers the drawback of requiring the housing to be of greater overall size and volume than is required merely to provide protection for the valves, thus reducing the insulating efficiency of the housing and requiring an increase in material construction costs, as well as occupying an area on the ground beneath the valves which could otherwise be utilized for other purposes. The known pipeline mounted housings suffer from one or both of two major drawbacks—the lack of access space, especially where relatively small panels or doors are used, for operating or repairing the valves, and the need in many instances to remove the entire housing from the pipeline to obtain access to the valves.

It is an object of this invention to provide a valve housing or cover which occupies a relatively minimal amount of space necessary to provide protection to the valves or other elements of a pipeline exposed to ambient conditions, which is attached directly to the pipeline such that it is suspended above the ground or base surface, and which has a removable component which provides a maximum amount of access to the valves without the need for removing the entire housing from the pipeline. The housing may have various other features to increase the efficiency and usefulness of the device, such as insulation means or internal heating means. These and other objects are accomplished, as explained in detail below, by providing a valve housing having a lower portion connected directly to the pipeline or connecting flanges on either side of the valves, where the lower portion does not extend substantially above the pipeline, and an upper portion which is completely removable from the lower portion, the upper and lower portion being preferably insulated and joined together in a watertight manner.

SUMMARY OF THE INVENTION

The invention is a housing or cover which surrounds the valves, gauges, reducers, backflow preventors, relief ports, or other like elements on exposed sections of pipelines, the housing protecting the valves, etc. from damage from the elements, and in particular protecting them from freeze damage. The housing is constructed of two primary members, a lower or base member and an upper or cover member. The base member is generally rectangular in shape with a bottom, two end walls and two side walls. In the top of each of the end walls is a semi-circular channel to receive the lower half of the pipeline. A thin mounting bracket shaped as a semi-circle with two flanges extending laterally is positioned atop the pipeline and fastened to the end walls to secure the base member to the pipeline or pipeline flanges, such that the bottom of the base member is suspended above the surface of the ground, floor or slab. The base member has a generally rectangular interior, and an upstanding barrier flange extends around the upper perimeter of the interior and on the sides of the semi-circular channel to prevent water or debris from entering the interior. The cover member corresponds in shape to the base member, having a top, two side walls and two end walls, with the end walls having semi-circular channels in their bottom edges to fit around the pipeline or pipeline flanges. The cover member mates with and fits onto the base member to form a closed housing, and is preferably secured by latches such that the entire cover member can be removed from the base member. The cover and base member are preferably formed of sheet metal such as aluminum or stainless steel and further provided with foam insulation. An electrically powered heating element may be incorporated into the housing to insure that temperatures within the housing remain sufficiently elevated. With this construction, the entire cover member can be removed from the base member, thereby allowing maximum access to the valves, etc., while the base member remains attached to the pipeline.

BRIEF DESCRIPTION OF THE DRAWINGS

FIG. 3 is a side view of the housing installed on a pipeline with stabilization lines and ground anchors.

DETAILED DESCRIPTION OF THE INVENTION

Figure 1:
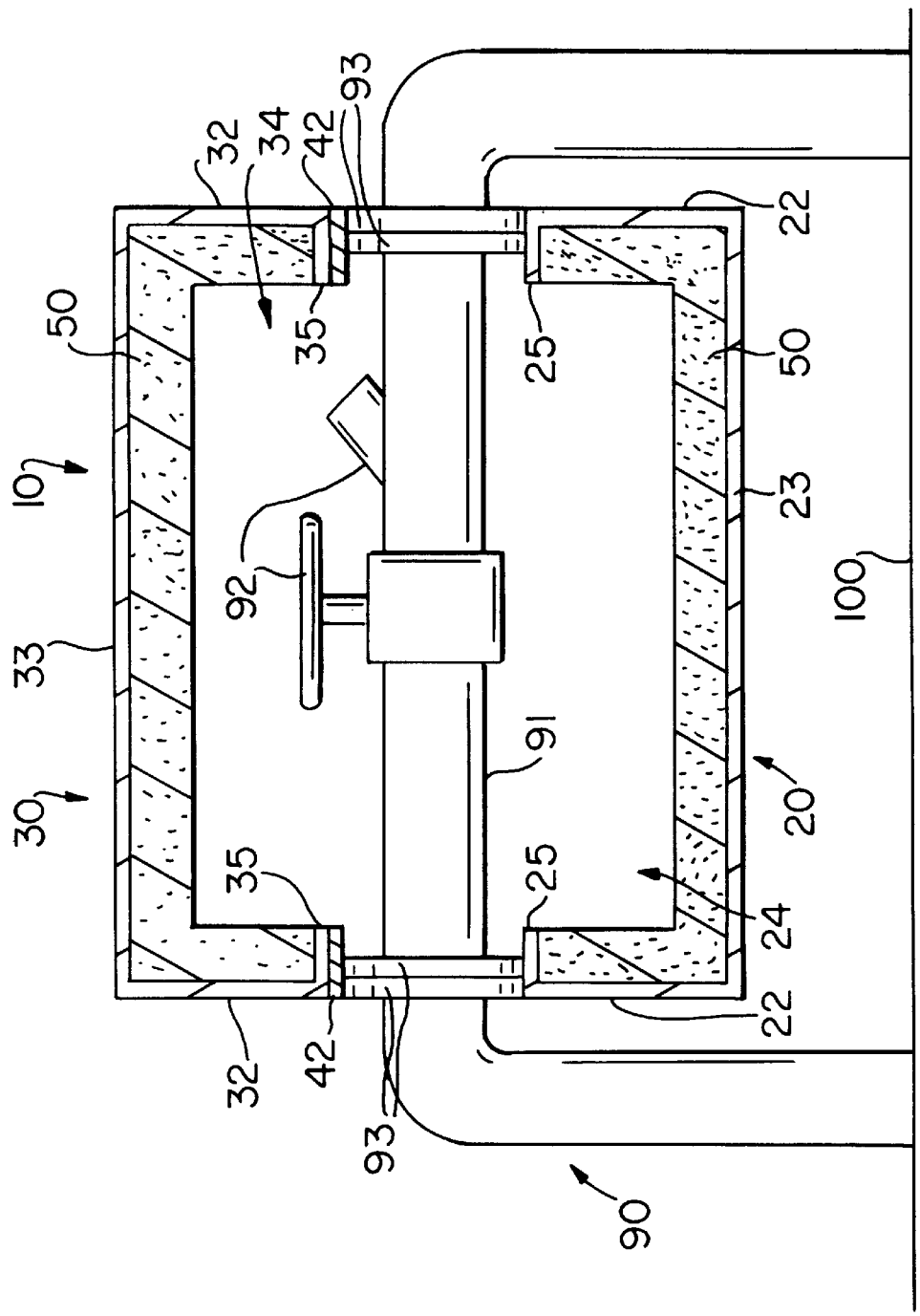
FIG. 1 is a cross-sectional side view of the housing installed on a pipeline.

With reference to the drawings, the invention will now be described in detail with regard for the best mode and the preferred embodiment. The invention is in general a housing 10 comprised mainly of a lower base member 20 and an upper cover member 30 which join to form a watertight covering surrounding the valves, gauges, reducers, backflow preventors, relief ports, or other like elements 92, hereinafter referred to collectively by the term valves, on exposed horizontal sections 91 of pipelines 90 carrying liquids or gases which need to be protected from the elements, and in particular which need to be protected from freezing temperatures. The particular dimensions of the housing 10 will vary depending on the size of the pipeline 90 and pipeline connecting flanges 93, and the size, number and configuration of the valves 92 to be covered. For example, pipelines 90 or pipeline flanges 93 may typically range from 1 to 14 inches in diameter, and the housing 10 could be as large as 4 by 4 by 8 feet in size, or even larger.

Figure 2:
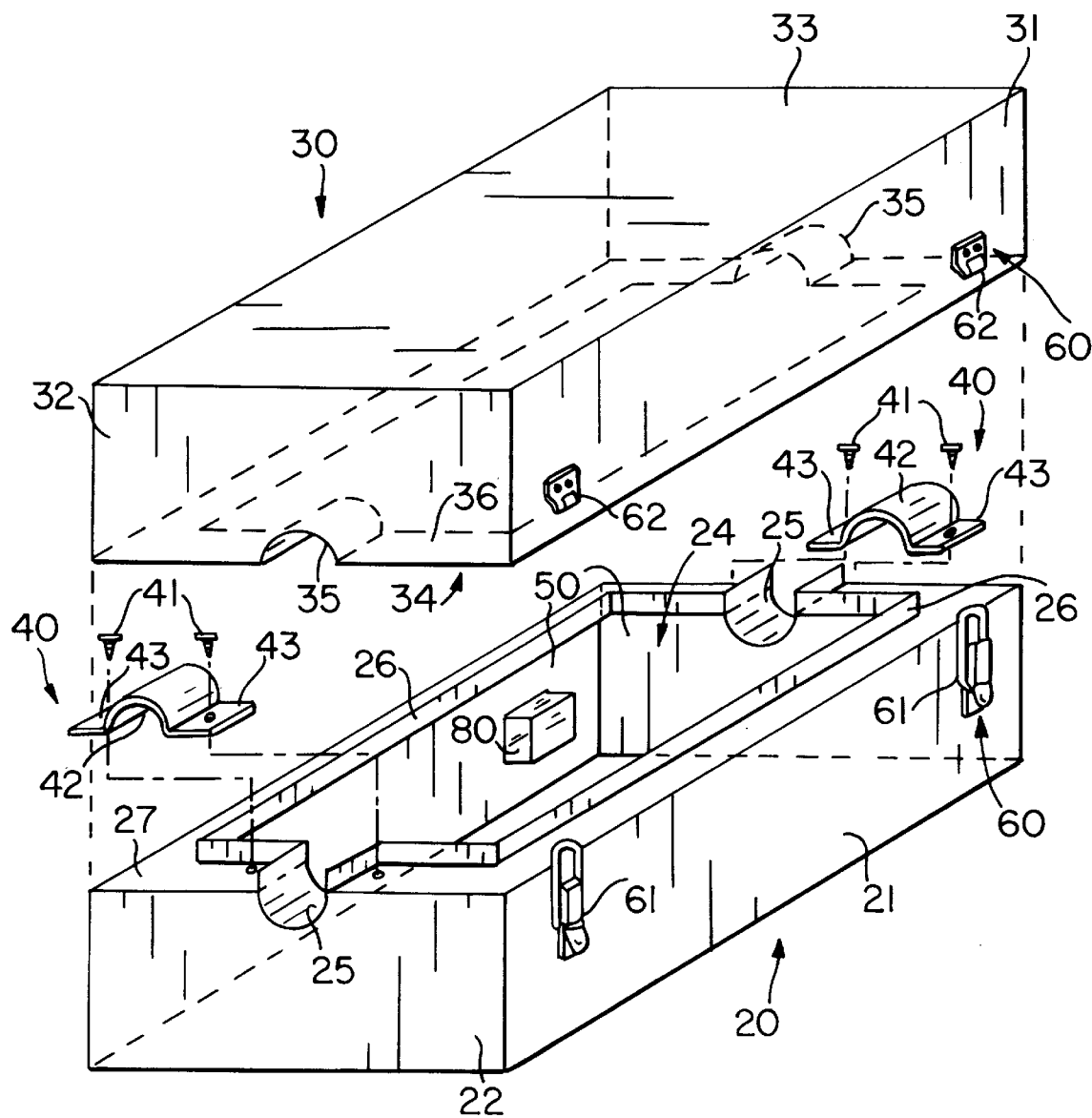
FIG. 2 is an expanded perspective view of the housing.

As seen with reference to FIGS. 1 and 2, the housing 10 is the combination of a generally rectangular base member 20 having a bottom 23, two opposing side walls 21 and two opposing end walls 22, preferably constructed of a relatively thin sheet metal material such as aluminum or stainless steel, fiberglass, or a rigid polymer ranging from ⅛ to ⅜ inches thick. The bottom 23, side walls 21 and end walls 22 are constructed and joined in a watertight manner, such as by welding. The combination of the side walls 21, end walls 22 and bottom 23 define an open, generally rectangular, interior area 24 which receives the valves 92 of the pipeline 90, preferably without direct contact to the valves 92. An upper mating surface 27, generally horizontal, extends a short distance inwardly from the upper edges of the side walls 21 and end walls 22, and is preferably composed of the same material as the bottom 23, side walls 21 and end walls 22. The upper mating surface 27 provides a relatively large surface contact area for supporting the lower mating surface 36 of the cover member 30 in a manner which precludes entry of water or debris between the base member 20 and cover member 30.

In the upper portion of each wall 22 is positioned a semi-circular pipe channel 25, which is sized to mate with the outer surface of the pipeline 90 or the pipeline flanges 93 to which the housing 10 is to be attached. The pipe channel 25 extends from the outside to the interior 24 of the base member 20, and is preferably formed of a thin sheet material similar to the material composing the bottom 23, side walls 21 and end walls 22. Extending a small distance upwardly around the inner perimeter of the upper mating surface 27 and extending a small distance upwardly from the sides of the pipe channel 25 is a thin barrier flange or lip 26, which is a continuous sheet member which prevents water from flowing across the upper mating surface 27 and into the interior area 24 of the base member 20. The barrier flange 26 is also preferably composed of the same material as the bottom 23, side walls 21 and end walls 22.

Preferably, the base member 20 is provided with insulating material 50 to increase the effectiveness of the housing 10, the insulating material comprising any suitable material such as an elastomeric expanded foam. The insulating material 50 is preferably adhesively bonded to the interior of the bottom 23, side walls 21 and end walls 22. For example, 1 inch thick panels of RUBETEX brand insulation from Rubetex or ARMAFLEX brand insulation from Armstrong, both well known in the industry for this purpose, may be utilized.

The base member 20 is mounted on and connected directly to the pipeline connecting flanges 93 or to the pipeline 90 itself on the horizontal segment 91, with the end walls 22 positioned to either side of the valves 92 being protected. Mounting means or brackets 40 are provided to affix the base member 20 to the flanges 93 or pipeline 90. As shown in FIG. 2, mounting means 40 may be constructed as a thin member with a semi-circular curved segment 42 with two attachment flanges 43 extending laterally, apertured to receive mechanical fastening members 41, such as screws or the like, The mounting means 40 is positioned on the upper side of the flanges 93 or pipeline 90 above the pipe channels 25 and connected to the base member 20 such that the combination of the pipe channels 25 and the mounting means 40 encircles the pipeline 90 and securely attaches the base member 20 so as to be suspended above the ground 100. In this manner the overall size of the housing 10 can be minimized, since the base member 20 only needs to extend far enough to enclose the valves 92 and does not need to extend completely to the ground 100, and thus the area beneath the base member 20 can be utilized for other purposes if desired. The upper mating surface 27 is located at the approximate mid-line of the horizontal segment 91 of pipeline 90, with only the barrier flange 26 extending any higher.

The cover member 30 is essentially the complement to the base member, in that it too is a generally rectangular member having a top 33, two opposing side walls 31, two opposing end walls 32 and a lower mating surface 36, all defining an open, generally rectangular, interior area 34. The cover member 30 is preferably formed of the same materials, a thin sheet metal, fiberglass or polymer material and insulating material 50, and in the same manner as the base member 20. A semi-circular pipe channel 35 preferably formed of the same material as the top 33, side walls 31 and end walls 32 is positioned in each end wall 32 and extends from the outside through to the interior 34. The cover member 30 is positioned above the valves 92 with the pipe channels 35 situated atop the flanges 93 or pipeline 90. The cover member 30 is aligned with the base member 20, such that when placed on top of the base member 20 the mating surfaces 27 and 36 abut and the barrier flange 26 extends upward along the inside of the cover member mating surface 36. The combination of the base member 20 and the cover member 30 form a closed housing 10 which fits snugly about the pipeline 90 and protects the valves 92 from the ambient. The combined interior areas 24 and 34 are separated from the atmosphere by the insulating material to prevent the valves 92 from freezing. Preferably the base member 20 and the cover member 30 are releasably connected to each other by connection means 60, which may comprise any suitable mechanism, and as shown in the drawings may comprise latches 61 and hooks 62 properly positioned.

While the base member 20 and the cover member 30 may be joined by hinges 73, as shown in FIG. 3, such that the cover member 30 pivots completely away from the base member 20 and rests in the open position even with or below the mating surface 27 of the base member 20, it is preferred that the two elements 20 and 30 be only temporarily connected in a manner which allows the cover member 30 to be completely removed from the base member 20. This provides the maximum access on all sides for working on or operating the valves 92 when necessary, as there will be no part of the housing 10 situated above the midline of the pipeline 90 after the cover member 30 has been removed, except the small barrier flange 26.

For use in extreme temperature environments, the housing 10 may also be provided with heating means 80, shown generally in FIG. 1, which may comprise any known system familiar to the art. Commonly, heating means 80 are electrically powered with thermostatic controls. In addition, where the housing 10 is large, it may be provided with stabilization lines 70 extending from the corners of the base member 20 to the ground 100, as shown in FIG. 3.

It is understood that certain equivalents and substitutions for elements set forth above may be obvious to those skilled in the art, and therefore the definition and scope of the invention is to be as set forth in the following claims.

I claim:

1. A housing device for a pipeline having valves extending from a horizontal segment, the device comprising:
   (A) a generally rectangular base member having a bottom, two side walls, two end walls and an upper mating surface connected together to define an open interior to receive the valves of a pipeline, where each of the two end walls further comprise a semi-circular pipe receiving channel;
   (B) mounting means to connect said base member to the horizontal segment of said pipeline; and
   (C) a generally rectangular cover member having a top, two side walls, two end walls and a lower mating surface connected together to define an open interior to receive the valves of said pipeline, where each of the two end walls further comprises a semi-circular pipe receiving channel;
   where said cover member and said base member in combination enclose said valves with said upper mating surface and said lower mating surface abutting each other, and where said cover member is removable from said base member while said base member remains connected to said horizontal segment of said pipeline.

2. The device of claim 1, where said cover member and said base member further comprise insulating material mounted internally.

3. The device of claim 1, where said base member further comprises an upwardly extending barrier flange connected to the inner perimeter of said upper mating surface adjacent said interior area to prevent water from flowing into said interior area.

4. The device of claim 1, where said device is suspended on said pipeline.

5. The device of claim 1, where said cover member is completely removable from said base member.

6. The device of claim 5, where said cover member is secured to said base member by connection means.

7. The device of claim 6, where said connection means comprise latches and hooks.

8. The device of claim 1, where said mounting means comprises a pair of thin curved segments with laterally extending attachment flanges which are positioned over said pipeline and connected to said upper mating surface of said base member.

9. The device of claim 1, where said upper mating surface of said base member does not extend above said horizontal segment of said pipeline.

* * * * *